United States Patent Office 3,490,533
Patented Jan. 20, 1970

3,490,533
METHOD OF PLACEMENT OF POLYMER SOLUTIONS IN PRIMARY PRODUCTION AND SECONDARY RECOVERY WELLS
Homer C. McLaughlin, Duncan, Okla., assignor to Halliburton Company, Duncan, Okla., a corporation of Delaware
No Drawing. Filed Feb. 28, 1968, Ser. No. 709,148
Int. Cl. E21b 43/22, 43/20
U.S. Cl. 166—270     13 Claims

ABSTRACT OF THE DISCLOSURE

This invention is an improved method for the recovery of oil by injecting a polymerizable chemical monomer dissolved in water containing a polymerization catalyst through a well bore and into an oil bearing formation and permitting the latent period of the catalyst to expire at some distance away from the well bore to thereby polymerize the monomer to a polymer. Oil recovery may then be resumed through said well bore or the polymer may be used for secondary recovery by allowing the resulting polymer solution to spread by using conventional flood water.

BACKGROUND OF THE INVENTION

The field of the present invention pertains to the recovery of oil by either primary production or secondary recovery water flood injection technique.

Recently polymer solutions have been introduced into the formation around a well bore to increase oil production. The polymer solution may be injected into the producing strata of a production well. The result of the presence of the polymer in the strata is a reduction in water production without essential damage to oil production. This method is described in U.S. Patent No. 3,308,885 to Sandiford.

Polymer solutions are also used in the secondary recovery of oil by injection of an aqueous flooding medium into the oil bearing formation through an input well penetrating the formation. The injection provides the energy and flushing action necessary to force oil remaining within the formation into nearby output wells penetrating the same formation. The use of a polymer solution having a higher viscosity than water tends to avoid several of the problems associated with the use of water. It is particularly difficult to remove very viscous oils using ordinary water or brine because these flooding materials are substantially less viscous than the oil and have been found to be relatively ineffective in displacing the viscous oil from the formation. The more viscous polymer solution results in increased effectiveness. The non-viscous flooding materials tend rather to break through the oil front at isolated points bypassing much of the oil and removing only a portion of it. The situation is further aggravated by the presence of zones of high permeability at various levels in the oil bearing strata. These zones also permit the escape of substantial portions of the relatively low viscosity water and brine solutions without their functioning to displace oil ahead of it. In all of these cases, polymer solutions have resulted in improved production.

A difficulty with the injection of polymer solutions is the high pressure required to inject the polymer at the well bore. Radial spread away from the well bore multiplies the number of capillaries through which the polymer solution flows; thus after it leaves the well bore, less pressure is required to move the viscous polymer solution. The high pressure required to inject a viscous polymer solution at the well bore increases risk of damage to the formation by fracturing.

SUMMARY OF THE INVENTION

Briefly, the present invention concerns a novel process for the introduction of a polymer solution into the formation around a well bore which comprises the injection of a polymerizable monomer dissolved in water and containing a polymerization catalyst having a latent period into the well bore, pressurizing the water containing the monomer and the polymerization catalyst so that it flows from the well bore into the surrounding formation and permitting the monomer to polymerize within the formation after the latent period of the catalyst has expired. After polymerization, the polymer solution may be left in place with the resumption of production through the well bore. Alternatively, secondary recovery may be employed by causing the resulting polymer solution to spread within the formation by following the polymer solution with flood water whereby oil is displaced in the formation ahead of the spreading polymer solution toward at least one output well communicating with the same formation.

It is an object of the present invention to provide a novel process for the recovery of oil.

More particularly, it is an object of the present invention to provide a means whereby a viscous polymer can be formed within the formation away from the well bore thereby eliminating the need for greatly increased injection pressures.

Another object of the present invention is to provide a means for the secondary recovery of oil where the injection fluid is of low viscosity and exhibits low resistance to injection into the formation at normal water flood pressure.

Still another object is to provide a means of primary recovery of oil whereby a polymer is formed in the producing strata of a well.

These and other objects and advantages of the present invention will become apparent from a more detailed description which follows.

DESCRIPTION OF PREFERRED EMBODIMENTS

According to the present invention, a low viscosity solution of a monomer dissolved in water and containing a catalyst is injected into the well bore and hence into the formation under a pressure in the range normally used in water flooding. The catalyst may be added to the solution containing the monomer or added to the water prior to the addition of the monomer thereto but the former is preferred. The monomer solution is easily injected since it has low resistance to flow. Since the catalyst is dissolved in the monomer solution, the monomer polymerizes and forms in situ a viscous polymer solution in the formation. The catalyst has a latent period, i.e., it does not initiate polymerization for a period of time after it is introduced into the monomer solution, so that the polymerization takes place only after the solution has been displaced away from the immediate area of the well bore.

It will be understood that the monomer injection may be carried out at any stage during a normal water flooding operation, although the monomer injection is usually followed by the further injection of flood water. According to the present invention, the viscosity of the polymer formed in the formation can be controlled to suit the needs of the formation. In general, a more viscous polymer is required to sweep or push out more viscous oils. Conversely, less viscous oils do not require as viscous a polymer in order to sweep them out of the formation. High monomer concentration tends to produce high molecular weight polymers whereas low molecular weight concentration tends to produce low molecular weight polymers. High polymerization rates also tend to produce low molecular weight polymers while slower polymerization rates increase the molecular weight. This is due to the fact that rapid polymerization is normally dependent upon the presence of many nuclei of growing polymers and the multiplicity of growing polymer chains results in exhaustion of the monomer supply before high molecular weight can be obtained.

Techniques for conducting the water flooding operations, in which this invention may be used, are well known in the art. Before the flooding medium is introduced into the oil bearing formation, the nature of the formation to be flooded is determined. Considerations must be taken into account such as the shape of the formation, the viscosity of the oil, the permeability of the formation, and the like. Having determined the flooding pattern, injection of the flooding medium is accomplished through one or more input wells penetrating the oil bearing formation with high pressure pumping equipment. Upon introduction of the flooding solution into the formation, a general displacement of the oil away from the input well results. The oil is thus forced into adjacent output wells. This flooding operation is usually carried out until the output wells are producing such a large proportion of water relative to oil that the process is no longer economical. By the practice of the present invention, oil is produced economically at the output wells for a longer time and the quantity of oil obtained at the output wells is increased. At the same time, the risk of damage to the formation by fracturing is reduced since no viscous materials which cause high injection pressures are present during the initial injection. The various details of water flooding are not described herein since they are already familiar to those skilled in the art.

In another embodiment of this invention, the polymer may be left in the producing strata of a production well to increase oil production. The reason for the increased oil production is not fully understood but it appears that the presence of the polymer changes the oil/water mobility ratio in favor of the oil. The permeability of the formation to oil is essentially unchanged but the permeability of the formation to water may be reduced as much as 80%. The net result is a reduction of water production and a resulting increase in oil production.

Preferably, the monomers used in the practice of this invention contain at least 1 carbon-to-carbon double bond. Examples of such monomers include acrylamide, acrylic acid, acrylonitrile, sodium styrene sulfonate, methacrylic acid, diallylamine, hydroxyethyl methacrylate, methacrylamide, etc. The monomers may be copolymerized with other monomers mentioned above or may be used in mixtures which form a mixture of polymers. Furthermore, a small amount of crosslinking monomer such as a diallyl monomer may be incorporated into the polymer to produce crosslinking. The crosslinking monomer should be in low concentration. An excessive amount of crosslinking monomer will cause gelation. Such gelation creates a plug rather than a desired viscous but still flowable fluid. In the present invention, it is desired that fluid flow be slowed in water saturated capillaries, but not stopped. An effective composition providing a crosslinked polymer solution is 97 grams water, 3 grams acrylamide, 2 grams sodium bicarbonate, 0.0075 gram methylene bisacrylamide (the crosslinking monomer), 0.0025 gram cobalt acetate, 0.1 gram disodium salt of ethylene-diamine tetracetic acid, and 0.125 gram t-BH-70. This composition provides 3 to 4 hours latent time and over 50 centipoises at 140° F. Other crosslinking monomers which may be used are disclosed in U.S. Patent No. 3,334,689, the disclosure of which is incorporated herein by reference. It is normally desirable that the polymer produced be at least partially soluble in water or other fluid in which it is carried.

Various catalysts and retarders may be incorporated into the monomer solution to provide for polymerization at the desired time and to the desired degree. Examples of suitable catalysts are organic peroxides such as tert-butyl hydroperoxide, di(tert-butyl)peroxide and methyl ethyl ketone peroxide; and inorganic peroxides such as ammonium persulfate, etc. The catalyst is chosen so that polymerization is not initiated until the monomer solution is in the formation away from the well bore. Such catalysts are said to have a latent period and are well known to those skilled in the art. The latent period is that interval of time between addition of the catalyst until the viscosity begins to increase as a manifestation of polymerization.

Various accelerators for the polymerization such as N,N-dimethylaniline, β-dimethylaminopropionitrile, etc. may be used and are well known to those skilled in the art. Also, various well known retarders such as potassium ferricyanide, potassium manganicyanide, hydroquinone, etc., may also be used.

The following examples are presented solely to illustrate the invention and should not be regarded as limiting in any way. In the examples, the parts and percentages are by weight unless otherwise indicated.

EXAMPLE I

A formulation was prepared containing 98 grams of water, 2 grams disodium hydrogen phosphate, 1.5 grams acrylamide and 0.2 gram of peroxide. The sample was mixed at 75° F. and then placed into a bath at the appropriate temperature. After convenient intervals of time, the viscosity was measured at the bath temperature. The viscometers used were the Brookfield Rheolog Recording Viscometer and the Brookfield LVF. The Brookfield UL adapter was used at viscosities less than 100 cps. The viscometers were used at 6 rps. for all readings. The system containing 1.5 grams of acrylamide per 100 grams was latent for 6 hours before polymerization started. At 6 hours, the viscosity was 1 centipoise; at 11 hours, 10 centipoise; and at 80 hours, 50 centipoise. When only 1.2 grams of acrylamide were used, the ultimate viscosity reached was about 15 centipoise. Therefore, by regulating the amount of acrylamide used, the viscosity can be raised or lowered as required.

EXAMPLE II

This example illustrates the affect of various retarders and accelerators on the viscosity of the polymer solution. The accelerator considered was β-dimethylaminopropionitrile (DMAPN). Disodium hydrogen phosphate duohydrate, a buffer, was used to control pH when no DMAPN was used. The retarder was potassium ferricyanide. Test conditions and results are set forth below in Table 1.

TABLE 1.—VISCOSITY VARIATION CAUSED BY ACCELERATORS AND RETARDERS

| | 10 grams Acrylamide and 90 grams Water at 75° F. | | | | | |
|---|---|---|---|---|---|---|
| | Grams per 100 grams solution | | | | Time, minutes to 50 cps. | Viscosity, 24 hours |
| Test No. | AP[3] | DMAPN[4] | DHPD[5] | PFC[6] | | |
| 1 | 0.5 | 0.4 | 0 | 0 | 1.5 | 1,300 |
| 2 | 0.5 | 0.4 | 0 | 0.01 | 9 | 500 |
| 3 | 0.5 | 0.4 | 0 | 0.02 | 23 | 313 |
| 4 | 0.5 | 0.4 | 0 | 0.03 | 55 | 150 |
| 5 | 0.5 | 0 | 2 | 0 | 169 | [1] <100,000 |
| 6 | 0.1 | 0.1 | 0 | 0 | 15 | [2] <100,000 |
| 7 | 0.2 | 0.2 | 0 | 0 | 4 | 15,800 |

[1] When diluted with 100 grams water, the viscosity measured 36,500 cp.
[2] When diluted with 100 grams water, the viscosity measured 4,500 cp.
[3] Ammonium Persulfate.
[4] β-Dimethylaminopropionitrile.
[5] Disodium Hydrogen Phosphate Duohydrate.
[6] Potassium Ferricyanide.

EXAMPLE III

The following example illustrates systems using other monomers to obtain water soluble polymers within the scope of the invention.

TABLE 2.—0.2 GRAM AMMONIUM PERSULFATE, GRAMS MONOMER PLUS GRAMS WATER =100 GRAMS, 140° F., ALL TESTS

| Test No.: | Monomer system chemical | Grams | Na₂CO₃, grams | Time, days | Viscosity, centipoises | Acidity, pH |
|---|---|---|---|---|---|---|
| 1 | Acrylamide | 2 | | | | |
|   | Acrylic acid | 1 | 3 | 1 | 6.5 | 9.6 |
|   |   |   |   | 4 | 5.7 | 9.6 |
| 2 | Acrylonitrile | 3 | | | | |
|   | Acrylic acid | 1 | 3 | 3 | 1.3 | 9.6 |
| 3 | Acrylonitrile | 2 | | | | |
|   | Acrylic acid | 1 | 3 | 3 | 1.3 | 9.8 |
| 4 | Acrylonitrile | 1 | | | | |
|   | Sodium styrene sulfonate | 1 | 2 | 3 | 1.2 | 10.2 |
| 5 | Acrylic acid | 2 | 3 | 3 | 1.7 | 9.1 |
| 6 | do | 3 | 4 | 3 | 1.7 | 9.0 |
| 7 | Methacrylic acid | 2 | 3 | 3 | 1.5 | 9.4 |
| 8 | do | 3 | 4 | 3 | 2.7 | 9.5 |
| 9 | Acrylic acid | 2 | | | | |
|   | Diallylamine | 1 | 3 | 3 | 1.8 | 9.0 |
| 10 | Water | | | | 0.47 | |

EXAMPLE IV

This example illustrates the affect of various materials, normally found in the environment in which this invention is practiced, on the polymerization rate. Various compositions containing monomer and catalyst were polymerized in the presence of environmental materials. All polymerizations and viscosity measurements were carried out at 140° F. The composition of the various monomer formulas and the results of the polymerization tests are set forth in Table 3 below. t-BH-70 is essentially 70% tertiary butyl hydroperoxide and 30% ditertiary butyl peroxide. Twelve (12) percent cobalt acetate is essentially 12 grams of cobalt acetate in 88 grams of glycol.

TABLE 3.—POLYMERIZATION ENVIRONMENT TESTS

| Formula A | | Formula B | | Formula C | |
|---|---|---|---|---|---|
| Chemical | Grams | Chemical | Grams | Chemical | Grams |
| Ammonium persulfate | 0.2 | t-BH-70 | 0.1 | t-BH-70 | 0.1 |
| Sodium carbonate | 2.0 | 12% Cobalt acetate | 0.1 | 12% Cobalt acetate | 0.1 |
| Acrylamide | 2.0 | Acetic acid | 0.1 | Sodium carbonate | 2.0 |
| Water | 98.0 | Acrylamide | 3.0 | DS-EDTA | 0.1 |
|   |   | Water | 97.0 | Acrylamide | 2.0 |
|   |   |   |   | Water | 96.0 |

| | | Formula A (pH-9.6), centipoises | | Formula B (pH-3.6), centipoises | | Formula C (pH-9.7), centipoises | |
|---|---|---|---|---|---|---|---|
| | Grams | 1 day | 4 days | 1 day | 4 days | 1 day | 4 day |
| Environment material: | | | | | | | |
| Control | 0 | 5.7 | 3.9 | 42.0 | 60.0 | 3.2 | 4.3 |
| Iron [1] | (²) | 8.9 | 4.4 | ³1.2 | 1.4 | 4.7 | 9.0 |
| Brass | (²) | ⁴3.1 | 3.3 | 1.6 | 1.5 | 3.4 | 4.2 |
| Bentonite | 4 | 8.7 | 189.0 | 7.0 | 13.4 | 6.9 | 6.7 |
| Silica | 20 | 5.8 | 5.1 | 7.6 | 8.3 | 3.6 | 4.5 |
| Attapulgite | 4 | 5.3 | 4.4 | 0.5 | 1.5 | 3.8 | 5.0 |
| Mineral oil | 10 | 7.8 | 5.2 | 63 | 60 | 3.7 | 4.7 |
| Diesel oil | 10 | 5.5 | 4.3 | 20 | 60 | 3.9 | 4.0 |
| CaCO₃ | 10 | Nd | Nd | Nd | Nd | ⁵7.0 | 7.0 |
| Zeogel clay | 1 | Nd | Nd | 1.2 | 1.0 | Nd | Nd |

[1] AISI 1020 carbon steel.
[2] Coupon size=2 x 1 x ⅟₁₆ inches. The coupon was withdrawn from the solution after 4 hours.
[3] Rusty precipitate.
[4] Blue solution, white precipitate.
[5] The pH dropped to 6.6.

EXAMPLE V

This example illustrates the use of an anti-gelation agent to prevent formation of gels. When higher concentrations of acrylamide are used, gels will form instead of the mere high viscosity desired. These gels often form in apparent complete absence of crosslinking monomer. A monomer solution containing 100 grams of water plus acrylamide, 2 grams of sodium carbonate, 2 grams of ammonium persulfate and an anti-gelation agent was contacted with iron for 4 hours and polymerized at a temperature of 140° F. at a pH of from about 9.3 to about 9.8. The anti-gelation agents tested were methacrylamide (MAM), the disodium salt of ethylenediamine tetraacetic acid (DS-EDTA), triethanolamine (TEOA) and ethylene glycol. The results are set forth below in Table 4.

TABLE 4.—ANTI-GELATION AGENT TESTS

| | Time, hr. | Control | DS-EDTA 0.1 gm. | TEOA 0.1 gm. | Glycol 0.25 gm. | Glycol 0.1 gm. | Glycol 0.5 gm. | MAM 1.0 gm. |
|---|---|---|---|---|---|---|---|---|
| Acrylamide, gm. | | | | | | | | |
| 2.0 | 24 | 4.9 | 4.3 | 4.5 | | | 4.65 | 3.3 |
|   | 48 | 5.0 | 7.2 | 5.8 | | | 5.65 | |
|   | 120 | 4.5 | 6.4 | 6.7 | | | 6.65 | 3.8 |
| 2.5 | 24 | 14 | 8.0 | 7.8 | | | 10.7 | 5.0 |
|   | 48 | 7.1 | 12.2 | 9.3 | | | 9.25 | |
|   | 120 | 6.2 | 13.45 | 9.9 | | | 11.4 | 5.5 |
| 3.0 | 24 | Gelled | 16.5 | 12.2 | 14.0 | 17.0 | 16.0 | 7.3 |
|   | 48 | do | 17.8 | 13.6 | 16.5 | 17.2 | 23.0 | |
|   | 120 | do | 17.9 | 16.4 | 18.3 | 17.6 | 20.0 | 8.1 |
| 4.0 | 24 | do | 42 | 28.0 | | | 11.5 | 16.0 |
|   | 48 | do | 32 | 29.0 | | | | |
|   | 120 | do | 39 | 33.0 | | | 50.0 | 17.0 |

The foregoing examples are not to be taken as limiting the scope of the invention but are rather merely illustrative of different embodiments of the invention. Thus, a wide variety of monomers, catalysts, retarders and accelerators may be used in practicing this invention. These materials are known to those skilled in the polymer art and need not be further described in this disclosure. In general, the invention is applicable to the recovery of oil by a variety of methods, either primary or secondary, wherein the introduction of a polymer solution into the formation is desirable. Thus, it is intended that the invention be limited only by the lawful scope of the appended claims.

I claim:
1. A method for the recovery of oil in a producing formation which comprises injecting into the formation in proximity to a well bore a low viscosity solution of a polymerizable monomer dissolved in water containing a polymerization catalyst having a latent period, permitting the monomer solution to move a distance away from the well bore or adjacent thereto, and after the latent period of the catalyst has expired, permitting the monomer to polymerize to form as a final product a polymer and a relatively high viscosity liquid solution.

2. A method for the primary recovery of oil in a producing formation which comprises injecting into the producing strata of a production well a low viscosity solution of a polymerizable monomer dissolved in water containing a polymerization catalyst having a latent period and permitting the monomer to polymerize, after the latent period of the catalyst has expired, to form as a final product a polymer and a relatively high viscosity liquid solution.

3. The method of claim 2 wherein the monomer contains at least 1 carbon-to-carbon double bond.

4. The method of claim 2 wherein the monomer comprises acrylamide.

5. The method of claim 2 wherein the monomer comprises acrylamine and a crosslinking monomer.

6. The method of claim 5 wherein the monomer contains at least 1 carbon-to-carbon double bond.

7. The method of claim 5 wherein the monomer comprises acrylamide.

8. The method of claim 5 wherein the monomer comprises acrylamide and a crosslinking monomer.

9. The method of claim 5 wherein the molecular weight of the polymer formed is regulated to meet the requirements of the viscosity of the oil in the formation by control of the monomer concentration and the polymerization rate.

10. The method of claim 5 wherein the low viscosity solution contains an anti-gelation agent.

11. The method of claim 2 wherein the molecular weight of the polymer formed is regulated to meet the requirements of the viscosity of the oil in the formation by control of the monomer concentration and the polymerization rate.

12. The method of claim 2 wherein the low viscosity solution contains an anti-gelation agent.

13. A method for the secondary recovery of oil in a producing formation which comprises injecting through a well bore into the formation in proximity to the well bore a low viscosity solution of a polymerizable monomer dissolved in water containing a polymerization catalyst having a latent period, permitting the monomer solution to move a distance away from the well bore or adjacent thereto, permitting the monomer to polymerize, after the latent period of the catalyst has expired, to form a polymer and a relatively high viscosity solution and subsequently spreading the high viscosity solution within the formation by injection of flood water whereby oil is displaced in the formation ahead of the spreading high viscosity solution toward at least one output well communicating with said formation.

References Cited

UNITED STATES PATENTS

| | | |
|---|---|---|
| 2,842,492 | 7/1958 | Englehardt et al. |
| 3,044,548 | 7/1962 | Perry et al. _____ 166—33 |
| 3,070,158 | 12/1962 | Roper et al. _____ 166—9 |
| 3,180,410 | 4/1965 | Turbak _____ 166—9 |
| 3,268,002 | 8/1966 | Fischer _____ 166—33 |
| 3,282,337 | 11/1966 | Pye _____ 166—9 |
| 3,308,885 | 3/1967 | Sandiford _____ 166—42 X |
| 3,412,796 | 11/1968 | Dekking _____ 166—38 |

STEPHEN J. NOVOSAD, Primary Examiner

U.S. Cl. X.R.

166—275, 295, 300